United States Patent [19]

Bounini

[11] Patent Number: 4,626,199
[45] Date of Patent: Dec. 2, 1986

[54] SUBMERGED COMBUSTION CALCINATION

[75] Inventor: Larbi Bounini, Libertyville, Ill.

[73] Assignee: United States Gypsum Company, Chicago, Ill.

[21] Appl. No.: 727,078

[22] Filed: Apr. 25, 1985

[51] Int. Cl.⁴ .......... F27B 15/00; C04B 11/00; C04B 11/02
[52] U.S. Cl. .................. 432/58; 106/109; 423/171
[58] Field of Search ............ 432/58; 423/170, 171, 423/172, 555; 106/109, 110, 111, 114, 115

[56] References Cited

U.S. PATENT DOCUMENTS 3,542,347  11/1970  Goldney et al. .................. 432/58

FOREIGN PATENT DOCUMENTS 2043219  10/1980  United Kingdom ........... 423/172
690267   10/1979  U.S.S.R. ...................... 432/58

Primary Examiner—John J. Camby
Attorney, Agent, or Firm—Robert M. Didrick; Samuel Kurlandsky; Robert H. Robinson

[57] ABSTRACT

Gypsum is calcined by contacting it with the hot gases spewing out of a combustion tube submerged in the mass of gypsum. The formation of dead-burned anhydrite is reduced by surrounding the combustion tube with a second tube called a draft tube. Gypsum passing through the annulus between the tubes is heated by the hot gases and is ejected from the annulus to prevent repeated excursions into the hot gas zone at the muzzle of the combustion tube.

8 Claims, 2 Drawing Figures

SUBMERGED COMBUSTION CALCINATION

This invention relates to the calcination of gypsum to calcium sulfate hemihydrate by the direct contact with hot gases from the combustion of a fuel gas below the surface of the mass of gypsum. This is known as the submerged combustion method for calcination of gypsum.

The method and an apparatus therefor is taught in British Pat. No. 1,488,665. Gypsum, fed continuously into a calcination kettle, is heated both indirectly through the kettle walls and directly by hot combustion gases flowing from a tube submerged in the mass of solids. Agitation of the gypsum and the calcined products is provided by the churning action of the hot gases and liberated steam as well as by a mechanical stirrer. Calcined gypsum is removed at the same rate as fresh gypsum is introduced.

British Patent Application No. 2,043,219A teaches an improved apparatus for the calcination of gypsum by the submerged combustion process. The frustroconical bottom of the kettle is designed to prevent the accumulation there of calcined material and the concomitant "dead-burning" of the desired hemihydrate to insoluble anhydrite.

The British Pat. No. 1,488,665 and the British Patent Application No. 2,043,219A both teach the use of air in excess of that needed to support combustion of the fuel in order to control the temperature of the combustion gases and therefore, the composition and characteristics of the calcined product. The application notes that the principal product of calcination is hemihydrate if the temperature of the mass of calcining material is maintained at about 140° C. to 170° C. (284° F. to 338° F.) and that anhydrous calcium sulfate is the principal product at much higher temperatures.

The spraying of water into the hot combustion gases either before or after contact of the gases with the calcining gypsum is taught in British Patent Application No. 2,086,874A as a way to reduce the amount of insoluble anhydrite which is formed during calcination of gypsum by the submerged combustion process. The amount of energy required for the calcination of a given quantity of gypsum is increased, however, because much of the heat is being used to evaporate the water and heat the vapor.

The production of hemihydrate from gypsum by the submerged combustion process is more efficient from the standpoint of energy consumption than the conventional process wherein a kettle of gypsum is heated solely by an external flame. The capital expenditure required for the conventional kettle which must withstand almost continuous high temperature flames on its external walls is greater than that for the apparatus employed when all the heat is supplied directly to the mass of gypsum by hot combustion gases. The formation of excessive amounts of dead-burned anhydrite remains a major drawback, however, when calcination of gypsum by the submerged combustion process is considered. The spewing of hot combustion gases from the submerged combustion tube sets up a maelstrom into which some of the already heated gypsum is sucked again and again with the result that the eddying particles are overheated to the dead-burned stage before they escape back into the main mass of solids. The insoluble anhydrite is undesirable because it acts as a substantially inert filler during rehydration of the hemihydrate to make plaster products.

It is an object of this invention, therefore, to provide a submerged combustion process for the calcination of gypsum in which the formation of dead-burned insoluble anhydrite is minimized.

It is a related object of this invention to provide a method for the submerged combustion calcination of gypsum whereby the recirculation of calcined gypsum through the hot combustion gases is minimized.

It is a further related object of this invention to provide a process for the submerged combustion calcination of gypsum wherein the uncalcined gypsum is introduced into a calcination kettle through the combustion gases injection zone.

It is another object of this invention to provide an apparatus for the submerged combustion calcination of gypsum whereby the calcined gypsum is segregated from the combustion gases injection zone and the flow of uncalcined gypsum is directed into said zone.

It is another object of this invention to provide a submerged combustion method for calcination of gypsum which is more energy efficient and has a higher rate of production of hemi-hydrate.

It is yet another object of this invention to provide a calcination method well suited to the calcination of gypsum containing as much as 20% free water without pre-drying.

These and other objects of this invention which will become apparent are attained by surrounding the combustion tube of a submerged combustion calcination kettle with a draft tube which extends below the exhaust port of the combustion tube, feeding gypsum continuously into the kettle, burning a mixture of fuel gas and air in the combustion tube, discharging the hot combustion gases into the gypsum within the draft tube, and continuously drawing off calcined gypsum from the kettle.

The method and apparatus are described in more detail below with reference to the accompanying drawings, wherein.

Figure 1:
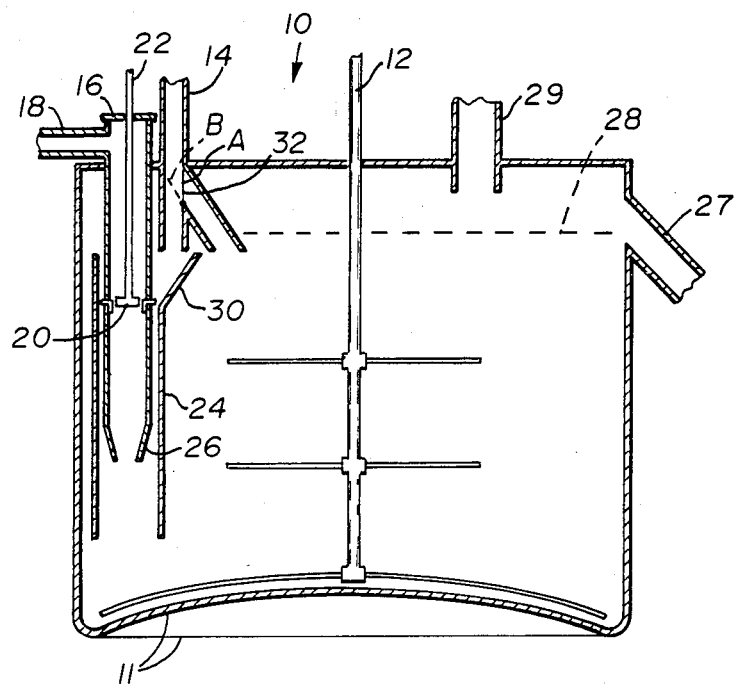
FIG. 1 is a schematic drawing of a calcination apparatus of this invention.

In FIG. 1, the kettle 10, having a domed bottom wall 11, is equipped with a stirrer 12 which is co-axial with the kettle, an inlet 14 for introducing uncalcined gypsum, a combustion tube 16 which communicates with an air supply duct 18 and encloses a burner 20 to which a fuel gas supply pipe 22 is connected. A draft tube 24 surrounds the combustion tube 16 and extends about 2 feet beyond the muzzle 26 of said tube 16; it ends from about 1 to about 3 feet from the wall 11. An outlet for calcined gypsum is provided by the conduit 27 which empties into a storage bin or the like. The level of material in the kettle indicated at 28 is maintained substantially constant by charging enough landplaster or the like to make up for the volume of hemihydrate being discharged through conduit 27. Spent combustion gases and steam are vented from the kettle through the vent 29.

The uncalcined gypsum may be charged directly into the mouth 30 of the draft tube 24 when the gate 32 is in position A or it may be charged into the kettle proper through the chute 34 when the gate 32 is in position B. Charging of the gypsum directly into the mouth 30 is preferred, however, because this ensures that all of the gypsum is subjected to the very high temperature at the muzzle 26. The level of material in the kettle, nevertheless, may be above or below the mouth 30. Only a small fraction of the gypsum is heated beyond the hemihydrate stage because the jet action of the combustion gases rushing out of the muzzle 26 creates a pressure drop around the muzzle which causes the heated solids in that zone to be pushed out of the draft tube by the on-rushing mass of cooler solids. Once ejected from the draft tube, the calcining solids join the churning mass within the kettle proper where they cool down to the overflow temperature with minimal recirculation through the hot gas zone.

Figure 2:
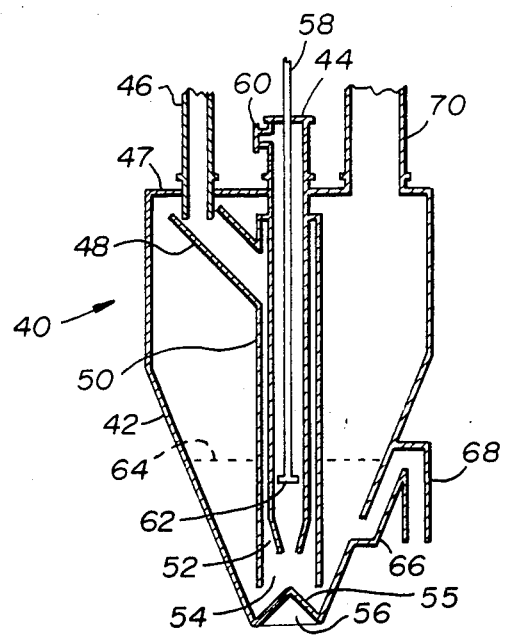
FIG. 2 is a schematic drawing of a preferred embodiment of this invention.

In FIG. 2, the kettle 40 has a bottom wall 42 of inverted frustoconical shape and a combustion tube 44 which is co-axial with the kettle. The gypsum feed duct 46 passes through the top 47 of the kettle and communicates with the chute 48 of the draft tube 50 which surrounds the combustion tube 44 and extends longitudinally beyond the constrictive muzzle 52 to leave a gap of at least about 1.5 inches (38 mm) between the discharge port 54 and the side 55 of an upright cone 56 made of heat resistant material. The gap must not be so small as to impede flow of the gypsum past the muzzle 52. Fuel gas and air are supplied through the pipes 58 and 60, respectively, to the burner 62.

The normal level of the calcining mass in the kettle 40 is indicated by the line 64. An outlet for calcining gypsum is provided by the overflow pipe 66 and the take-off pipe 68. Exhaust gas escapes from the kettle through the duct 70 which is connected to a dust collector (not shown).

The economies afforded by the submerged combustion method of calcination are retained and are made more attractive in the operation of the apparatus of this invention. The high velocity of the gases causes a pressure drop within the draft tube and the atmospheric pressure pushing down on the surface of the gypsum causes it to move toward the partial vacuum. The gypsum is heated to the calcining temperature by the hot gases and the boiling mass of fluidized solids is ejected from the draft tube. The hot gases are cooled by virtue of their release of heat to the gypsum and careful adjustment of the feed rate, the rate of discharge of the hemihydrate, and the rate of flow of the fuel gas and air will maintain the temperature of the solids within the conventional temperature range of 295° to 350° F. (146°-176° C.) for the production of hemihydrate. Recirculation of the hemihydrate through the hot gas zone is substantially eliminated and the time of contact between the hemihydrate and the hot gas is minimal. The formation of dead-burned anhydrite is therefore minimized.

A secondary but nevertheless important effect is provided by the very rapid heating of the gypsum. The hemihydrate produced by the rapid calcination is more dispersible than that made by the conventional process in which calcination is continuous but relatively slow in the externally heated kettles.

The draft tube may be rectangular, circular, or elliptical in cross-section and is preferably columnar in profile. An elliptical or circular cross-section is preferred becase of the possibility that small amounts of hemihydrate may stagnate in the corners of a rectangular tube. The columnar, i.e. straight-sided, profile provides an annulus around the combustion tube wherein the operative pressure drop occurs. As shown, the mouth 30 of the draft tube 24 may be flared outward at the top to increase the area from which gypsum can be pushed through the tube by the unbalanced atmospheric pressure above the tube. Any flaring of the lower portion of the draft tube away from the muzzle 26 or 52, however, must not defeat the pressure drop caused by the high velocity gases rushing from the muzzles which are preferably conical as shown in order to increase the velocity.

The area of the annulus between the draft tube 24 and 50 and its corresponding combustion tube will vary according to the size of the kettle and the desired rate of production. It is dependent upon the diameters of the draft tube and the combustion tube. The clearance between the two tubes may be as small as about ½ inch to as much as about 12 inches or even more. The diameter of the combustion tube is preferably from about 15 to about 36 inches, but it may be larger or smaller according to the desired throughput.

The stirrer 12 is necessary in the dome-bottomed kettle 10 but sufficient agitation of the calcining mass is achieved in the frustoconical kettle 40 by the thrust of solids and gases issuing from the draft tube 50 and rebounding from the frustoconical bottom wall 42 and the cone 56. External heating of the frustoconical kettle is not necessary because the heat from the submerged combustion is distributed throughout the mass of solids by such agitation.

The use of a draft tube and combustion tube need not be restricted to calcination within a kettle as described above. The draft tube itself may define the boundaries of a calcining vessel wherein crushed raw gypsum is introduced at one and the calcined gypsum, steam and spent combustion gases are discharged from the other end of the draft tube into a cyclone, baghouse, or the like where the steam and spent combustion gases are separated before the calcined gypsum is directed into storage bins or plaster mixers for a wallboard production line.

The following examples and comparative data are given to illustrate the invention more fully and to demonstrate the advantages of the apparatus and method of this invention. The specific embodiments recited here are not to be taken as restrictions on the scope of the invention claimed herein.

EXAMPLES 1-6

Landplaster (Plaster City) was calcined in an externally heated kettle 10 having the burner 20, the combustion tube 16 and the draft tube 24 mounted therein for two hours in order to obtain steady state conditions in the kettle before the burner 20 was ignited.

Calcination was then continued as fresh landplaster was added and calcined gypsum was removed continuously and the flow rate of natural gas through the pipe 22 was maintained at each of the values shown in Table 1 for about two hours before being changed to the next value. The volume of air supplied to the burner was in excess of the theoretically required amount as indicated in Table 1. In Examples 1,2,5, and 6, the mouth 30 of the draft tube was below the surface of the mass of calcining material, the landplaster was fed into the kettle through the inlet 14 and the gate 32 was in position B. The composition of the material flowing through the draft tube in such an arrangement was that of the average contents of the kettle. In Example 3 and 4, the landplaster was fed through the inlet 14 and the gate 32 was in position A, thus causing the landplaster to flow through the draft tube. The mouth 30 of the draft tube was again, however, below the surface of the calcining mass, thus allowing some of that mass to pass through the draft tube along with the fresh landplaster. The temperature of the calcined gypsum as it leaves the kettle through the conduit 27 was 320° F. (160° C.) in each example except as noted.

The percent of dead-burned anhydrite in the product and the hourly production rate are given in Table 1. The dead-burned anhydrite content for the control is an average of the values found in the analysis of 3 samples taken during the continuous calcination of landplaster in the same kettle a week before the submerged combustion calcination described above. The burner 20 was not operating and the draft tube was not in place during the "control" calcination.

TABLE 1

| Example | Gas Flow Rate (scfm)** | Percent Dead-burn | Production Rate (tons/hr.)*** | XS Air % |
|---|---|---|---|---|
| 1 | 24.5 | 1.63 | 9.7 | 300 |
| 2 | 39 | 1.53 | 11.2 | 300 |
| 3* | 39 | 1.30 | 11.2 | 300 |
| 4 | 58 | 1.84 | 12.7 | 200 |
| 5 | 58 | 3.76 | 12.7 | 200 |
| 6 | 24.5 | 1.63 | 9.7 | — |
| Control | — | 1.42 | 9.0 | — |

*Exit Temp. = 315° F. (157° C.)
**1 cfm = 2.8 × 10⁻² m³/min.
***1 ton/hr. = 907 Kg./Hr.

In contrast to the above, the calcination of Plaster City landplaster in the same externally heated kettle with the aid of hot combustion gases issuing from the combustion tube 16 but without a draft tube in place gave the results listed in Table 2.

TABLE 2

| Gas Flow Rate (scfm) | Percent Dead-burn | Production Rate (tons/hr.) | XS Air % |
|---|---|---|---|
| 35 | 2.16 | 10.6 | 320 |
| 35 | 2.74 | 10.6 | 325 |
| 58 | 2.41 | 12.7 | 320 |
| 58 | 3.13 | 12.7 | 325 |

As shown by these results, the high production rate which makes submerged combustion calcination so attractive can be achieved while reducing the amount of dead-burned anhydrite significantly when a draft tube is placed around the combustion tube. The superiority of the preferred embodiment of this invention, i.e., charging of the fresh landplaster through the draft tube, is indicated by a comparison of the results of Examples 4 and 5.

While particular embodiments have been shown and described, it is to be understood that modifications may be made within the scope of the following claims.

The subject matter claimed is:

1. A calcination apparatus comprising:
   a kettle having a top wall, a sidewall, a bottom wall, a duct extending through the top wall for the introduction of uncalcined material into the kettle, an exhaust vent, and a port for the discharge of calcined material;
   a burner;
   a first tube extending through the top wall into the kettle, said tube communicating with the burner and having an outlet for injecting hot combustion gases from the burner into the material to be calcined;
   a second tube surrounding the first tube and extending beyond the outlet of the first tube, the second tube having an inlet for the material to be calcined and an outlet which is co-axial with the first tube;
   said first and second tubes defining a passageway between them which empties into the second tube.

2. The apparatus of claim 1 wherein the duct opens directly into the inlet of the second tube.

3. The apparatus of claim 1 wherein the duct opens into the kettle beyond the inlet of the second tube.

4. The apparatus of claim 1 wherein the duct has three legs in the shape of an inverted Y, the upper leg of which extends through the top wall, and a gate which is operable to close either of the other two legs.

5. The apparatus of claim 1 wherein the kettle is frustoconical and co-axial with the first tube, said kettle having a smaller diameter at the bottom and having a co-axial, heat-resistant deflector projecting upward from the bottom toward the first tube.

6. The apparatus of claim 5 wherein the outlet of the first tube has converging walls.

7. The apparatus of claim 5 wherein there is a gap of at least about 1.5 inches between the outlet of the second tube and the deflector.

8. The apparatus of claim 5 wherein the duct communicates with the second tube.

* * * * *